United States Patent [19]

Walls

[11] Patent Number: 5,898,401
[45] Date of Patent: Apr. 27, 1999

[54] CONTINUOUS WAVE RADAR ALTIMETER

[75] Inventor: Raymond John Walls, Chelmsford, United Kingdom

[73] Assignee: GEC-Marconi Limited, Stanmore, United Kingdom

[21] Appl. No.: 07/211,270

[22] Filed: Jun. 9, 1988

[30] Foreign Application Priority Data

Jun. 10, 1987 [GB] United Kingdom ............... 8713528

[51] Int. Cl.$^6$ ................................................. G01S 13/32
[52] U.S. Cl. ........................... 342/82; 342/120; 342/145
[58] Field of Search ............................... 342/120, 134, 342/82, 198, 145, 85, 83, 137, 88

[56] References Cited

U.S. PATENT DOCUMENTS 2,991,467  7/1961  Clarke .
3,611,370  10/1971 Frasure et al. .
4,357,610  11/1982 Kingston et al. .

Primary Examiner—Gilberto Barrón, Jr.
Attorney, Agent, or Firm—Spencer & Frank

[57] ABSTRACT

A continuous wave radar altimeter comprises a pulsed power control (4), operable when the signal-to-noise ratio of the received signal is likely to be too low, to pulse the transmitted power so that the power varies between a non-zero base level and a higher level. The receiver channel (13, 14) is switched off during each transmitted pulse.

6 Claims, 3 Drawing Sheets

CONTINUOUS WAVE RADAR ALTIMETER

BACKGROUND OF THE INVENTION

This invention relates to a continuous wave radar altimeter.

In order to minimise the detectability of a radar altimeter, the transmitted power is kept to the minimum necessary to achieve an adequate signal-to-noise ratio, i.e. sufficient to obtain a reliable indication of height. However, it becomes necessary to increase the transmitted power temporarily when the signal-to-noise ratio drops, for example due to increases in flying height or to changes in the terrain. Previous methods of varying the power transmission have suffered from severe increases in detectability of the altimeter.

SUMMARY OF THE INVENTION

Accordingly, the invention provides a continuous wave radar altimeter comprising means for determining the height of the altimeter above ground by correlating a received signal with an encoded transmitted signal, pulse means for varying the transmitted power between a non-zero base level and a higher level, the periods at the higher level being pulses whose separations are of the order of the expected transmit-receive delay, and means responsive to the pulse means for rejecting signals received during the said transmitted pulses. Signals whose power varies in accordance with the invention are less easy to detect.

Preferably, in order to improve further the resistance to detection, the pulse means comprises a pseudo-random code generator for varying the said pulse separations.

BRIEF DESCRIPTION OF THE DRAWING

In order that the invention may be better understood, a preferred embodiment of the invention will now be described by way of example only, with reference to the accompanying simplified function diagram of a radar altimeter, of which.

DETAILED DESCRIPTION OF THE PREFERRED EMBODIMENT

Figure 1A:
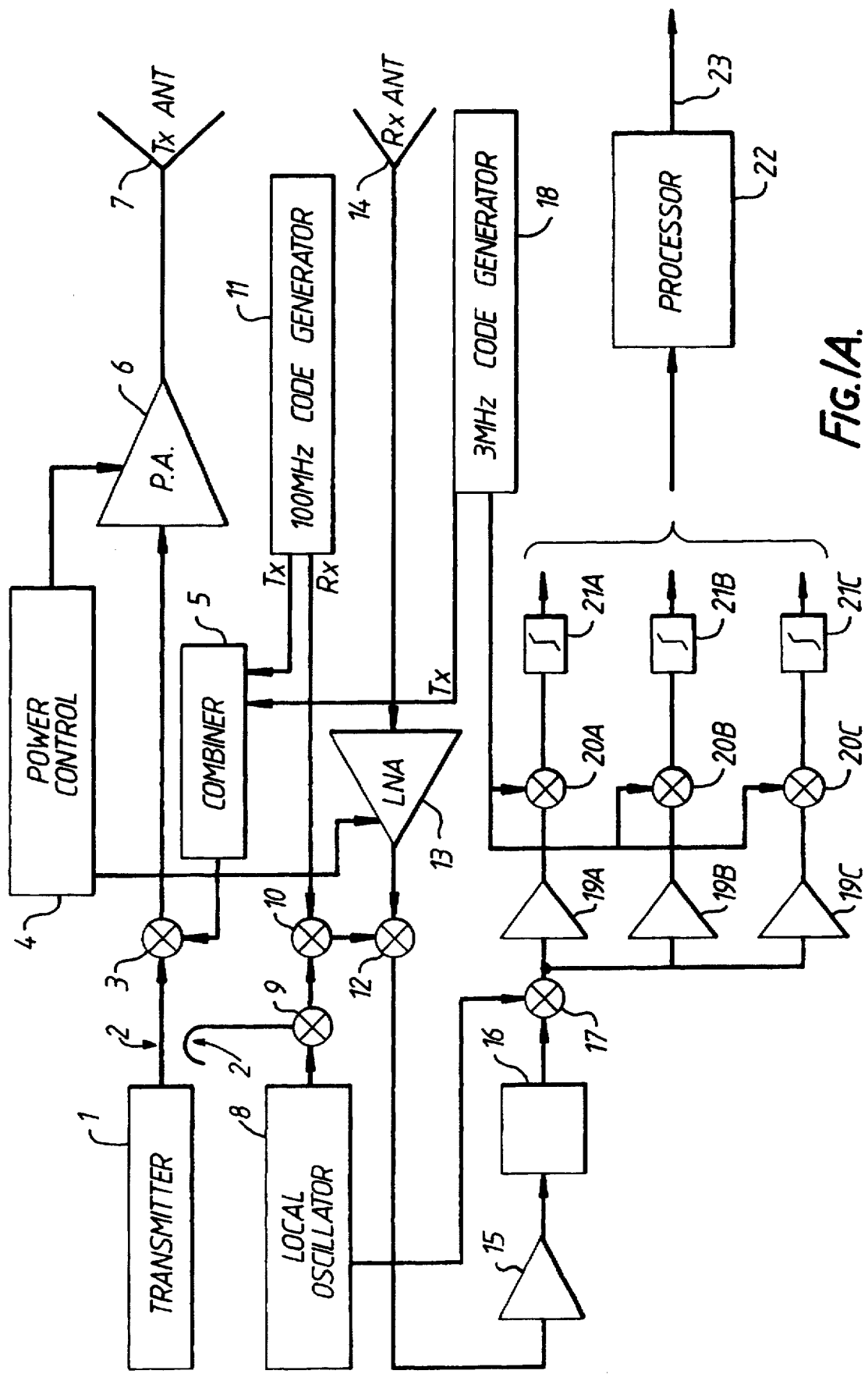
FIG. 1a and FIG. 1b are the two halves of the function diagram, linked by line 23.

With reference first to FIG. 1a, the radar altimeter comprises a transmitter 1 which provides a RF signal centred on 4.3 GHz by way of a power amplifier 6 to a transmitter antenna 7. The transmitter 1 is a microwave oscillator delivering 100 milliwatts. The transmission power output of the power amplifier 6 is controlled by a power control unit 4,.controlled by means described in greater detail below so that the transmitted power is the minimum necessary to ensure an adequate signal-to-noise ratio in the received signal after processing. The RF signal from the transmitter 1 is mixed by a mixer 3 with binary signals from a 100 MHz code generator 11 (the fast code generator) and a 3 MHz code generator 18 (the slow code generator), these signals having been combined in a combiner 5. Although denoted for convenience as a 3 MHz code generator, the slow code generator in fact generates a code at 3.225 MHz, so that one chip of the slow code represents a complete cycle of 31 chips of the fast code. It is important that, whichever values of these fast and slow code speeds are chosen, the fast speed should be an integral multiple of the slow speed. The output of the combiner 5 is the modulo 2 sum of the two codes produced by the fast and slow code generators respectively, which are pseudo-random P/N codes especially chosen to give the best performance in this particular application. In the preferred embodiment, the code is chosen so that the transmission is effectively noise-like with a 3 dB bandwidth of 100 MHz, using the 100 MHz chip rate.

Clearly the chip rate of the fast code generator is chosen as a compromise: the ability of the radar altimeter to resolve height to a high accuracy is proportional to the chip rate. Thus the transmitted output is a signal centred on 4.3 GHz and spread over a bandwidth of 100 MHz (at minus 3 dB) by a pseudo-random digital direct sequence phase encoding, with a chipping rate of 100 MHz.

The signal reflected from the ground, and from objects on the ground, is received by a receive antenna 14 and is amplified by a low noise amplifier (LNA) 13. The antennae 7,14 are sited so that the transmitter signal is attenuated ideally by at least 90 dB between the two antennae.

The output from the LNA 13 is mixed at the 4.3 GHz RF frequency in an analogue mixer 12 with a signal encoded with the code from the fast code generator 11 so as to despread the receive signal. The signal with which the LNA output is-mixed is derived-as follows. A local oscillator 8, for example a signal generator operating at 500 MHz, provides an output which is mixed in a mixer 9 with part of the signal from the transmitter 1, derived from a coupler 2 from the transmitter output. The signal from the mixer 9, which represents the transmitter signal offset in frequency by the pass band centre frequency of the IF amplifier, is then further mixed in a mixer 10 with a second output signal from the fast code generator 11. This further output comprises a spread spectrum code representing a part of the transmitted code and subjected to a controllable delay or phase difference relative to the transmitter code: the delay is controllable over a range of 0–30 chips if the short code is 31 chips long. Mixing the received signal from the LNA 13 with the modulated local oscillator results in a signal reduced in bandwidth from 100 MHz to 3 MHz (at minus 3 dB) centred on the IF frequency.

As previously mentioned the attenuation of a signal in the direct path between the transmitter and receiver antennae 7, 14 is ideally at least 90 dB, but there is inevitably some break through signal. This may be minimised by providing the signal from the coupler 2 to a quadrature network and four attenuators (not shown) so that a cancelling signal can be generated. Prior to reaching the-quadrature network, the signal is spread by the code from the fast code generator but subjected to a small, controllable delay. A central control processor (not shown) for controlling the operation of the circuitry shown in FIG. 1a and FIG. 1b has all the necessary information to enable it to control the four variable attenuators so as to "hill climb" to a minimum breakthrough level.

The output from the mixer 12 is fed through an IF amplifier 15 and an automatic gain control unit 16, controlled by the central control unit, both the amplifier 15 and automatic gain control unit 16 operating at a bandwidth of around 3 MHz. The IF amplifier 15 filters out all unwanted products and then amplifies the remaining signal which is mixed in a mixer 17 with the IF frequency from the local oscillator 8 to return the signal to base band frequency. This base band analogue signal is converted into digital form by a single bit over-sampled analogue-to-digital converter (not shown).

The resulting signal, now in digital form, contains the high resolution height information, but still remains to be despread further using the code from the slow code generator. This operation is performed by digital processing circuitry 20, 21, 22, yielding output data on line 23 which are further processed by data processing means represented schematically in FIG. 1b to provide the required height information.

In order to produce output-height data-within an interval which is acceptable for example for the pilot of an aircraft flying at low altitude, several parallel channels 19, 20, 21 are provided instead of just one channel, so that the digital processing is shared by these channels. These parallel channels operate using codes from the slow code generator staggered in phase relative to each other, so that each is in effect responsible for generating output data for a different band of heights. Referring again to FIG. 1a the signal from the mixer 17, after conversion to digital form, is mixed in a digital mixer 20A (20B, 20C), for example an exclusive OR gate, with a signal from the slow code generator 18 at a phase relative to the corresponding code applied to the transmitter which is controlled by the central control processor. The despread output from the mixers 20A, 20B, 20C are then fed to respective integrators 21A, 21B, 21C which perform a time integration of the signal in order to improve the signal-to-noise ratio. The outputs from all the integrators 21A, 21B, 21C of the parallel digital processing channels are provided to a processor 20 which in turn builds up in real and imaginary form an array of output data representative of the variation of amplitude with height and integrated over a particular time frame. This array is built up in a computer memory represented in FIG. 1b as the I and Q returns array 24.

The period over which the output signals are integrated represents a compromise between making maximum use of the transmitted power, in order to minimise the power radiated and thus reduce the likelihood of detection, and minimising the delay between transmission and the provision of height information. This compromise will not always be set at the same point, since it will be affected by, for example, the nature of the ground and the height above the ground at which an aircraft carrying the radar altimeter is flying. The higher the aircraft the lower the signal-to-noise ratio in the received signal for a given transmitted power, but the longer the tolerable delay between transmission and provision of information.

Assuming that the transmitted signal occupies a 3 dB bandwidth of 100 MHz, after despreading it is reduced to a theoretically zero bandwidth, which in practice is say 100 Hz. If the output of the final despreader or demodulator 20A (20B, 20C) is integrated for say 10 milliseconds, this would represent a filter of 100 Hz bandwidth. Noise with a frequency component above 100 Hz will then integrate to zero. Integration over a period of around 10 milliseconds has been found to produce data with an adequate signal-to-noise ratio.

Figure 1B:
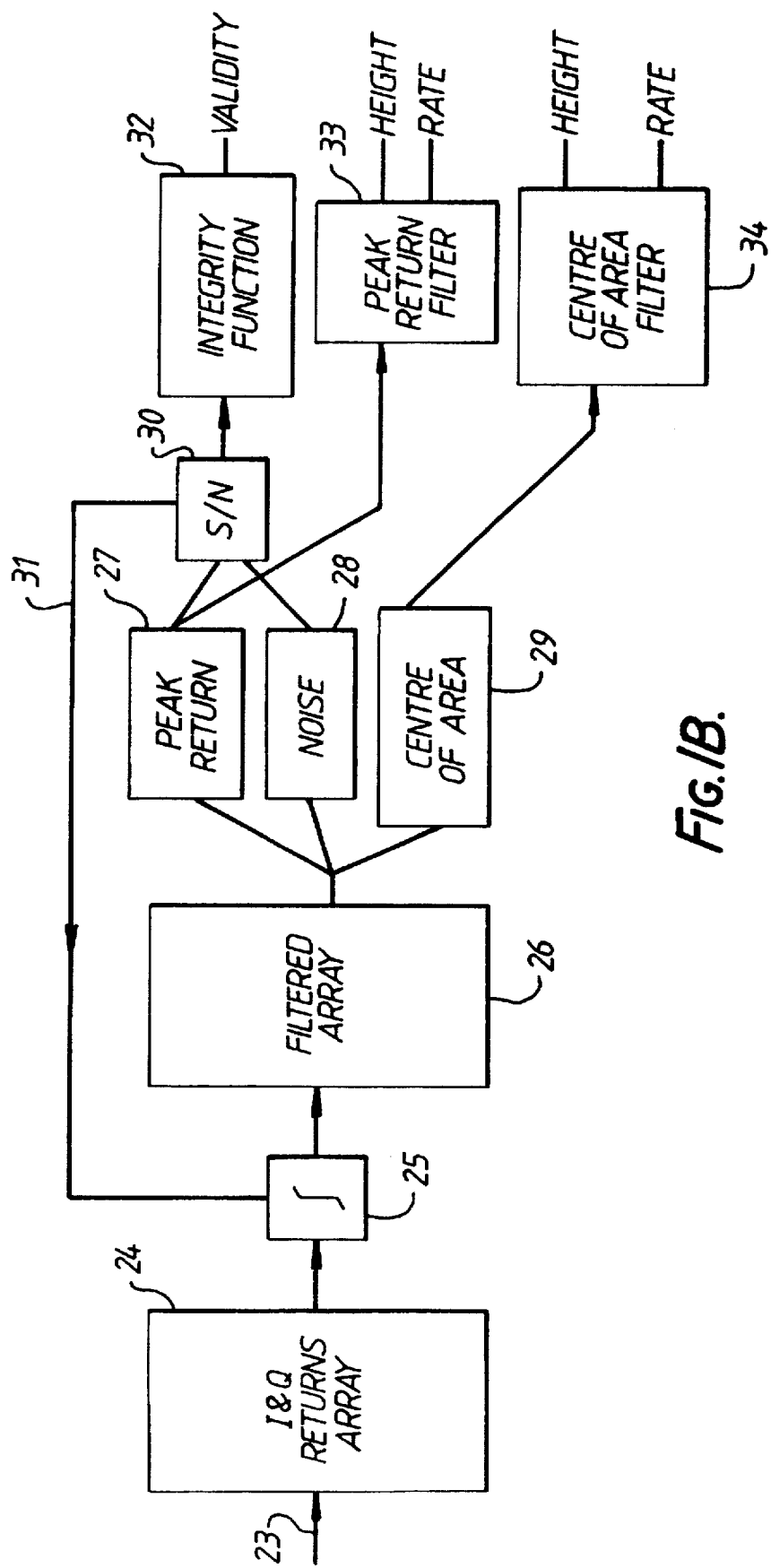
Figure 2:
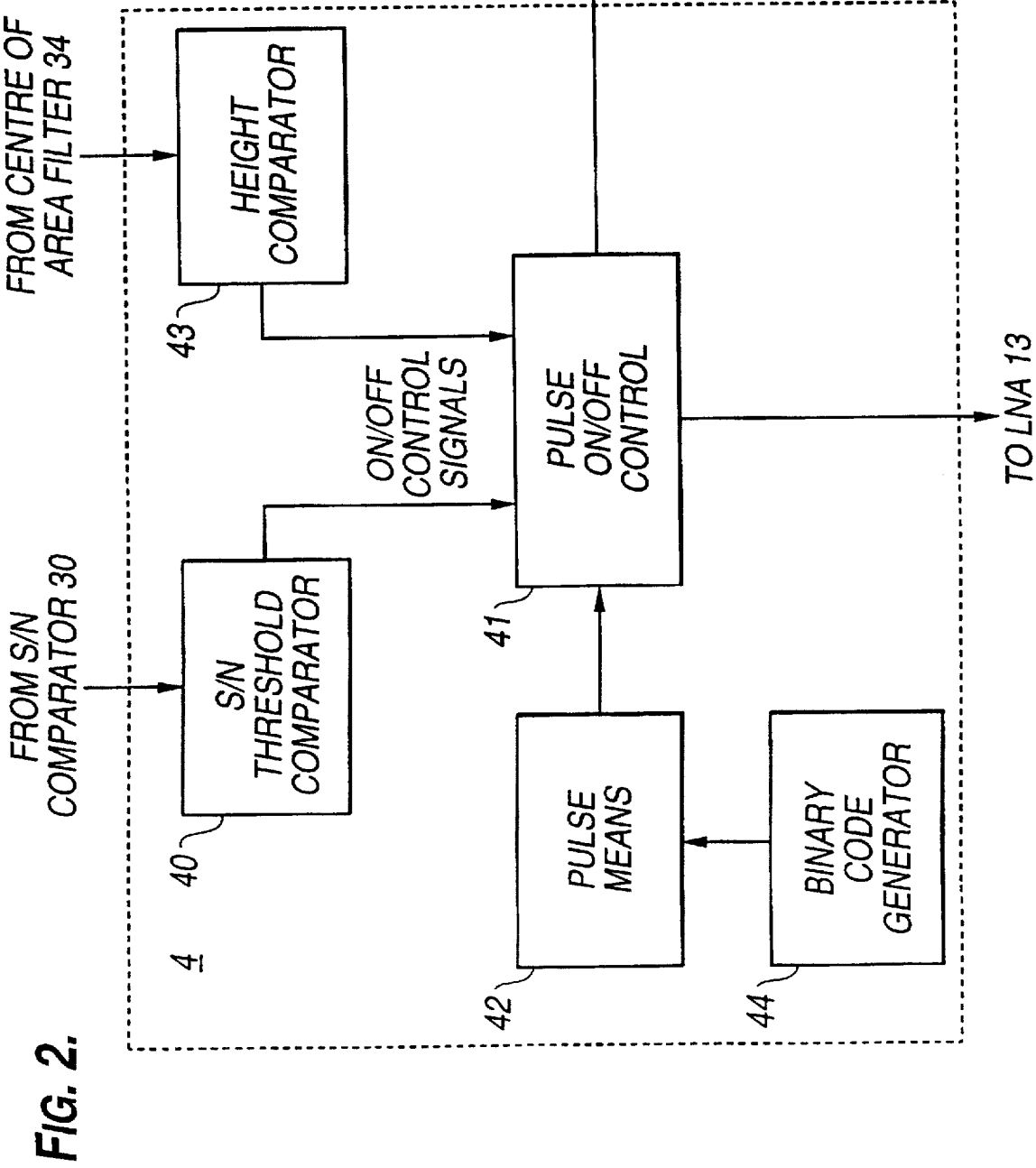
FIG. 2 is a block diagram of the power control unit 4.

The resulting array, containing digital numbers representing amplitudes in delay order, is then further processed by height processing means 25 to 34 as shown in FIG. 1b. These processes are carried out entirely in software.

Where necessary, further time integration is carried out by an integrating unit 25 whose integration period is controlled by a signal 31 from a signal-to-noise comparator 30 in accordance with a predetermined criterion. The lower the signal-to-noise ratio, the longer the integration period so as to improve that ratio: thus signal 31 represents a feedback stage. The integration performed in unit 25 is a straight accumulation of the in-phase and quadrature components of each delay value of the I and Q (real and imaginary) returns array 24. It is important that this integration is matched accurately to the code epoch, so that the time sidelobes are minimal. For this reason, the code generators are changed in synchronism with the integration period. The output of the integrating unit 25 is accumulated in a filtered array 26, which is scanned with a "bubble sort" digital processor to find the maximum value of amplitude and its location on the height axis. This information is output and stored as a "peak return" 27. The noise is also scanned for the n highest peaks, for example the four highest peaks, and an average of these is calculated and stored in a noise memory unit 28. The noise may be identified, for example, as comprising any signals having delays in the range between 5 metres and four fifths of the height of the peak return; alternatively, if the-peak return is very close to zero delay, the noise may be identified as those signals being between 50 percent and 100 percent of the maximum height.

Further, the filtered array 26 is scanned to locate an average height of the significant signals, which will in general be displaced from the peak return. Several algorithms for determining this average height may be used; the purpose is to identify the height of the ground. This information is stored in a "centre of area" store 29.

The signal-to-noise ratio comparator 30 receives as its input the peak return 27 and noise level 28, and provides the feedback signal 31 as mentioned above. The comparator 30 also provides an output to an integrity function unit 32 which assesses whether the data to be provided by the altimeter are likely to be meaningful: they will not be meaningful if the signal-to-noise ratio is too low. The integrity function unit 32 provides an output representative of the validity of the other output data.

The output of the peak return unit 27 is further processed to derive the delay exhibiting an amplitude of the peak less a predetermined fraction (for example one fifth) of the difference between the peak signal and the noise level. This peak signal is then further filtered in a peak return filter 33 which provides an output representative of peak height, for example the tops of buildings or trees. A centre of area filter 34 also provides post-filtering of-the centre of area data 29, to provide an output representative of the centre of area height, e.g. the level of the ground. For an aircraft which requires terrain contour matching, clearly this ground level information is required in addition to the peak level information. The ground level information is characteristic of the terrain, and may be matched against contour maps of the terrain, whereas the peak level information is necessary for safe flying.

The post filtering performed by the peak return filter 33 and the centre of area filter 34 performs three important functions: it reduces noise in the output, it makes the output correct for constant rate of change of height (acting as a second order filter), and it provides resistance against false lock-ons to noise or spurious signals by only allowing an output after the filter has started tracking the raw signals.

The power control unit 4 will now be described in greater detail.

When the comparator 30 indicates that the signal-to-noise ratio is low and the dwell time constraints forbid any further extension of the integration periods to correct this deficiency, then the power control unit 4 changes from a normal mode to a pulse mode of operation, in order to increase the average power transmitted for as long as is necessary. This mode change is likely to be required at flying heights of above a threshold of, say, 1500 metres, so an alternative means of signalling the mode change would be for the altimeter height output to be monitored and compared with a predetermined height threshold.

In the pulse mode, the power control unit 4 varies the gain of the power amplifier 6 such that the power modulation is in the form of a pseudo-random rectangular pulse waveform superimposed on a constant power level. The power level varies between the power level which it would have in the normal mode, and a higher power level, which may be anything from say 10 dB to 30 dB higher. The higher power level may be selected by the power control unit 4 in accordance with the perceived requirement for extra transmitted power, for example as a function of aircraft flying height or of signal-to-noise ratio. Clearly the level should be as low as possible,-to reduce detectability of the radar.

The pseudo-randomness of the intervals between the pulses, which pulses are of equal length, is intended to reduce detectability, and is provided by a binary code generator within the power control unit 4.

The LNA 13 is switched off by the power control unit 4 during each power pulse, in order to avoid any increase in the signal breakthrough from transmitter to receiver in the pulse mode. In order to ensure that no range information is lost as a consequence of this temporary inactivity of the receiver channel, the intervals between the pulses are selected to exceed the expected period for the return of signals from the furthest target. The intervals may therefore be equal to a predetermined interval or double that interval, depending on the binary code sequence, the predetermined interval being for example 10 microseconds.

The LNA 13 is also suppressed by the power control unit 4 so that the time sidelobes generated by the higher transmitted power are not integrated in with the return signal during the decoding of the received signal. Further, the pulses are synchronised with the code generator of the power control unit 4 so that the time sidelobe performance is maximised.

I claim:

1. A continuous wave radar altimeter comprising: a pseudo-random code generator; a phase modulator for modulating a continuous wave r.f. signal in accordance with code generated by said code generator; a transmitter for transmitting said modulated signal; pulse means for switching the transmitted power between a non-zero base level and a higher level, with the periods at the higher level being pulses whose separations are of the order of the expected transmit-receive delay, said pulse means including a pseudo-random code generator for varying said pulse separations; a receiver for receiving returned modulated signals; means, responsive to the pulse means, for rejecting signals received during said transmitted pulses; and means for determining the height of the altimeter above ground by correlating a received signal with said transmitted signal.

2. An altimeter according to claim 1, wherein the said rejecting means comprises an amplifier connected to receive the received signal and for varying the gain thereof, with the gain being controlled by signals from the said pulse means.

3. An altimeter according to claim 1, further comprising control means to set the pulse means to operate either in a pulse mode, in which the power is varied between said non-zero base level and said higher level, or a constant mode, in which the transmitted power is constant at said base level.

4. An altimeter according to claim 3, wherein said control means sets the pulse means to said pulse mode only if the altimeter is perceived to be above a predetermined height.

5. An altimeter according to claim 3, further comprising means for determining the signal-to-noise ratio of the received signal, and means for comparing the signal-to-noise ratio with a predetermined threshold to provide a signal to the control means indicative of whether the pulse means should be set to said pulse mode or said constant mode.

6. An altimeter according to claim 1, wherein said higher power level is between 10 dB and 30 dB above said base level.

* * * * *